March 10, 1970 R. E. WIENKE ET AL 3,500,306
APPARENT MOTION GUIDANCE SYSTEM FOR AIRCRAFT
Filed March 4, 1966 3 Sheets-Sheet 1
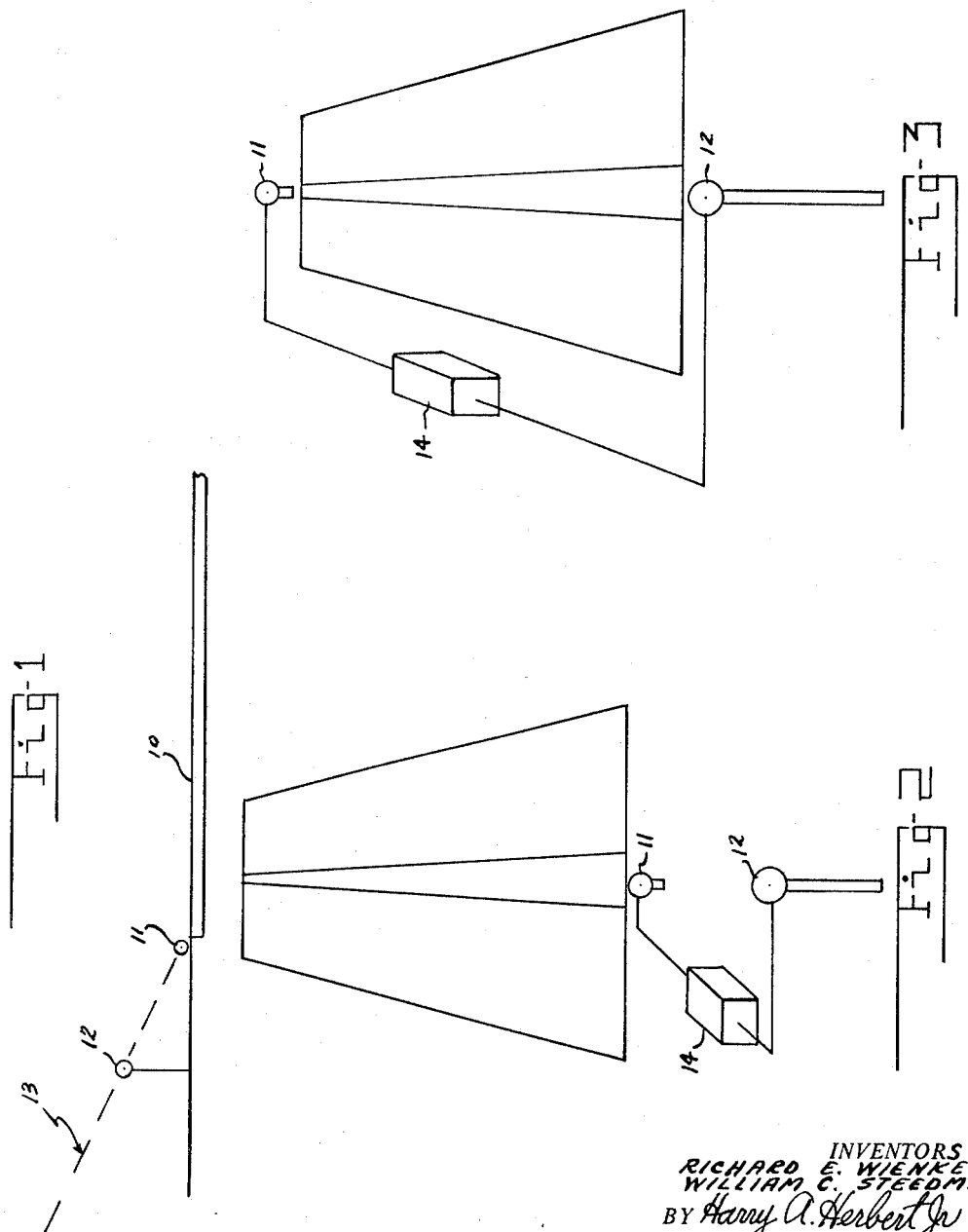
INVENTORS
RICHARD E. WIENKE
WILLIAM C. STEEDMAN
BY Harry A. Herbert Jr.
ATTORNEY
Richard J. Killore
AGENT

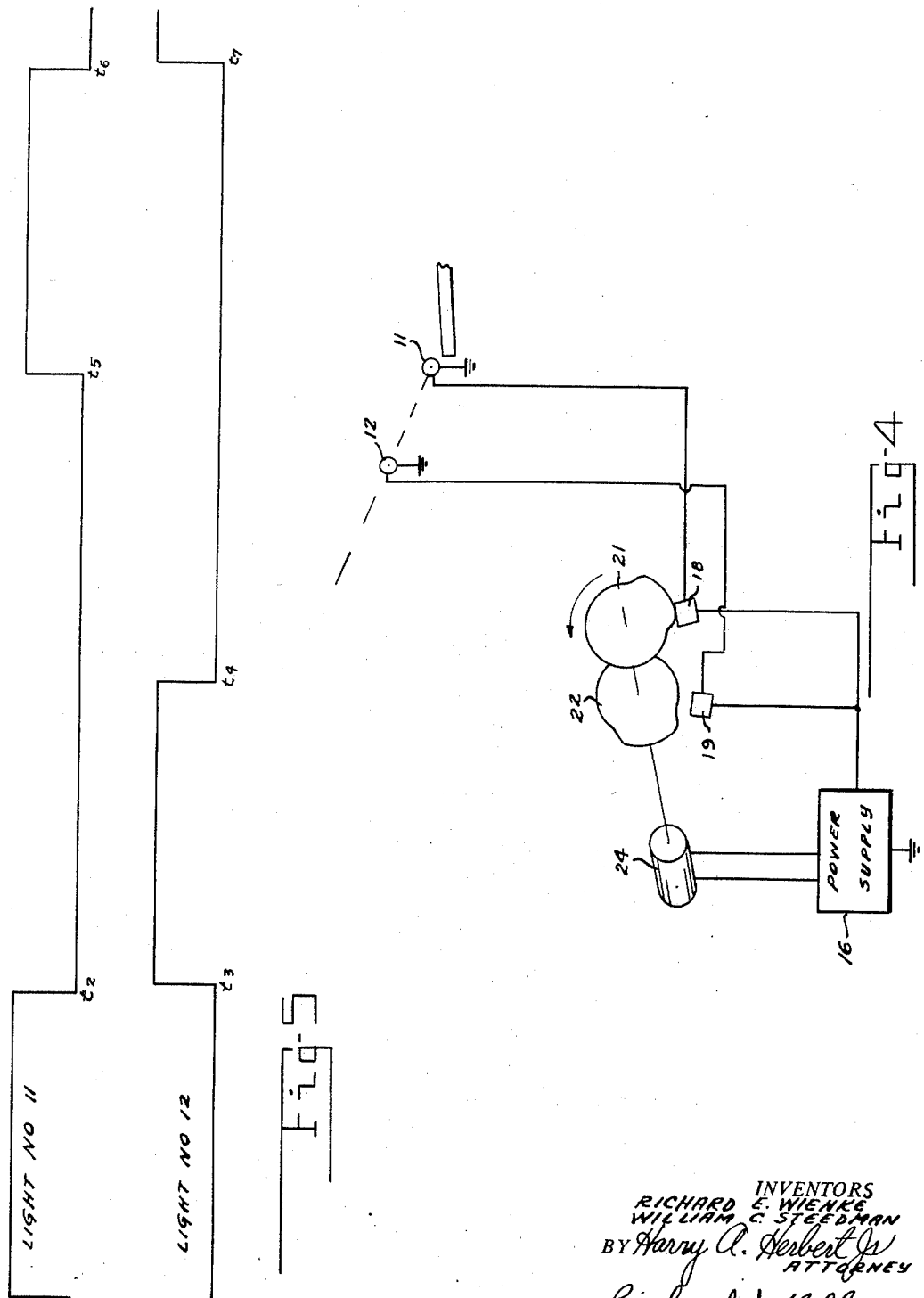

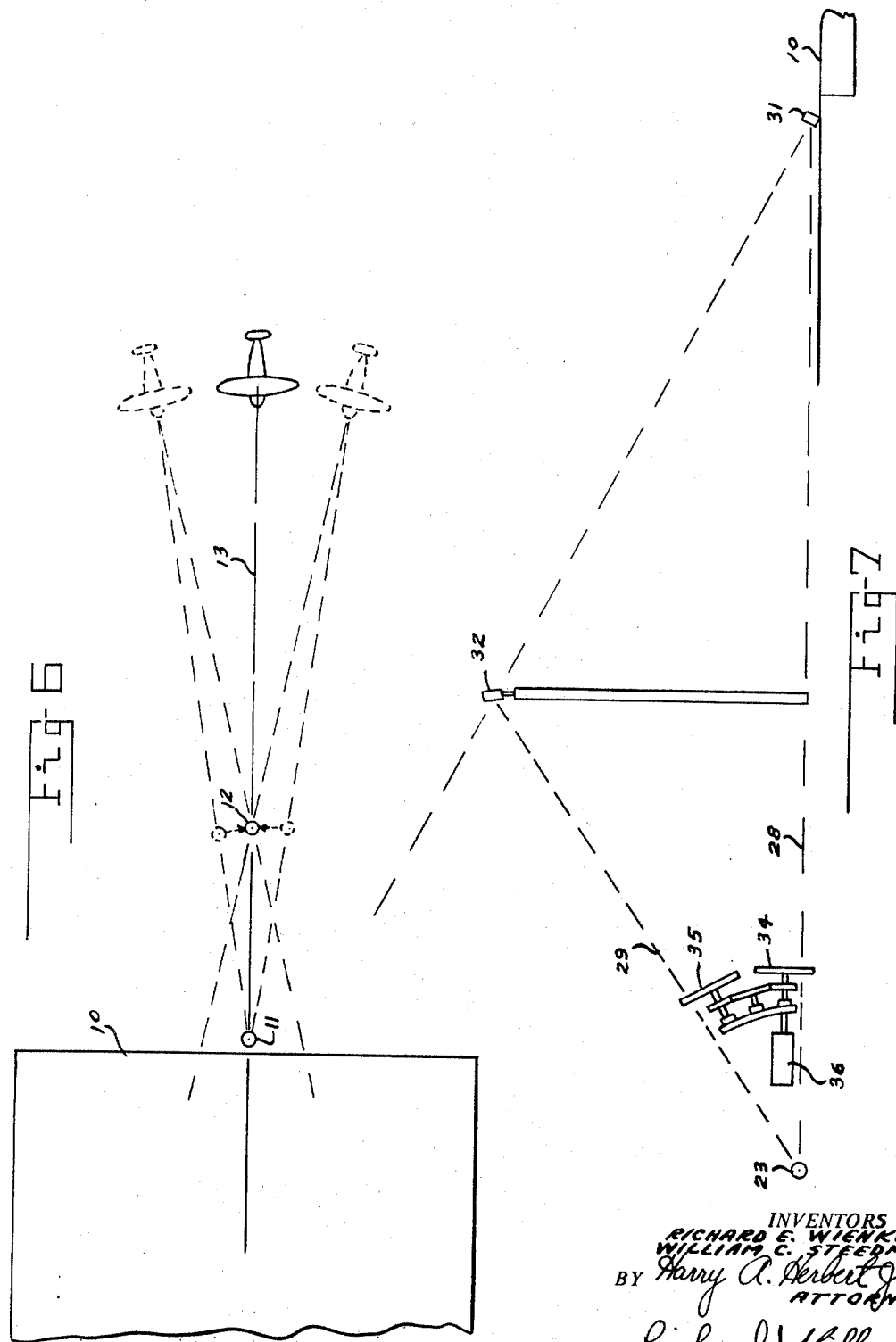

United States Patent Office 3,500,306
Patented Mar. 10, 1970

3,500,306
APPARENT MOTION GUIDANCE SYSTEM FOR AIRCRAFT
Richard E. Wienke, 7136 Belldale Ave. 45424, and William C. Steedman, 250 E. Hillcrest Ave. 45405, both of Dayton, Ohio
Filed Mar. 4, 1966, Ser. No. 534,294
Int. Cl. G08g 5/00
U.S. Cl. 340—25                                    5 Claims

ABSTRACT OF THE DISCLOSURE

A landing approach guidance system has two light sources located along the centerline of the runway in line with the desired glide path for aircraft. The light sources are flashed intermittently with the time duration between the flashing of the light closer to the aircraft and the flashing of the light further from the aircraft being substantially longer than the time duration between the flashing of the light further from the aircraft and the light closer to the aircraft. In one embodiment intermittently illuminated mirrors are substituted for the lights.

---

The invention described herein may be manufactured and used by or for the Government for governmental purposes without the payment to us of any royalty thereon.

This invention relates to guidance systems, such as for use in guiding an aircraft along a glide path to a landing on a runway.

One object of the invention is to provide an approach guidance system requiring fewer parts than prior art systems.

Another object of the invention is to provide an approach guidance system which gives precise and easily interpretable information.

These and other objects will be more fully understood from the following description taken with the drawing wherein:

FIG. 1 is a side plan view of a landing strip showing the landing approach guidance system of the invention;

FIG. 2 is an end view of the landing strip showing schematically the positions of the lights with respect to the landing strip;

FIG. 3 is an end view of a landing strip showing another possible location of the lights;

FIG. 4 is a schematic diagram of the control circuit for the device of FIG. 1;

FIG. 5 shows the lighting sequence for the guidance system of FIG. 1;

FIG. 6 is a schematic diagram of the light signaling system of the invention showing how the proper corrective action is indicated; and FIG. 7 is a side plan view of another embodiment of the invention.

Various types of systems have been used for assisting the pilot in landing an aircraft. Some of these systems are very elaborate requiring many lights and a great amount of control equipment.

The landing approach system of this invention is based on the principle of apparent motion. The apparent motion is obtained when an axis is formed by two alternately flashing lights which are separated in depth and when sighted by an observer off of that axis. In this configuration, the information concerning the nearness to the axis is given by the subjective impression of the length of the apparent motion; the longer the motion, the farther the observer is from the axis while no motion indicates the observer is on the axis.

A more efficient guidance system is provided if the flash sequence is altered so that the motion appears as a single repetitive vector. If the light farthest from the observer is flashed first, the motion is in the direction that the observer must go in order to return to the axis. Therefore, the motion can be considered as a polar coordinate system. In this case, however, the origin of the vector lies at the periphery of the coordinate system and the vector always terminates at the geometric origin of the coordinate system.

With reference to FIG. 1 of the drawing, reference number 10 is a landing strip having a first light source 11 and a second light source 12 adjacent thereto. The light sources 11 and 12 are in line with the center of the landing strip, as shown in FIG. 2, with light sources 11 and 12 being located in line with the desired glide path indicated at 13. The light sources 11 and 12 are energized and controlled by a power supply 14 and timing device, as will be described in greater detail with respect to FIG. 4. Depending upon the particular application, light sources 11 and 12 may be located at one end of the landing strip 10 as shown in FIGS. 1 and 2, or at opposite ends of the landing strip as shown in FIG. 3.

As shown in FIG. 4, the light sources 11 and 12 are energized by a power supply 16. Microswitches 18 and 19 are provided between the power supply and lights 11 and 12, respectively.

The microswitches 18 and 19 are controlled by cams 21 and 22, respectively, which are driven by a constant speed motor 24. One possible timing sequence for energizing light sources 11 and 12 is shown in FIG. 5. As can be seen, the interval between the energization of light source 11 and the energization of light source 12 is shorter than that between the energization of light source 12 and the next energization of light source 11. This timing sequence provides an apparent motion when the lights are not in line indicating the correction necessary to bring the plane into alignment with the desired glide path, as shown in FIG. 6.

One apparatus built consisted of two 200-watt incandescent lamps with an industrial timer of the synchronous motor type with cam drive switches. The timing sequence was: first flash for 500 ms.; interflash duration 10 ms.; second flash 500 ms.; and second interflash duration 1000 ms. The lamps and motor were powered by 120 volts, 10 amp, 60-cycle power supply. Other timing sequences were tested and it was found that the precise timing sequence was not critical as long as the second interflash duration was made considerably longer than the first interflash duration. With this system, it was found that acquisition was possible up to 8.5 miles, and that the system was easy to learn and easy to follow.

While light sources are shown in the device thus described, other indicating means may be provided. FIG. 7 shows a system wherein with the use of mirrors, only a single light source is required. In this device, lights 11 and 12 are replaced by mirrors 31 and 32 which are illuminated by a single light source 23. Light choppers 34 and 35, driven by constant speed motor 36, interrupt the light beams 28 and 29 in the same sequence as shown in FIG. 5. It is to be understood that other light imaging system could also be used, such as by means of various optical arrangements. Other forms of electromagnetic radiation such as radio or radar beacons may be used to provide all weather capability in which case the appropriate sensor and display equipment would be provided within the aircraft. Also, it is to be understood that the system could be used for vehicles other than aircraft such as for land, water or space vehicles.

There is thus provided a guidance system which gives precise and easily interpretable information and which requires fewer parts than prior art devices.

We claim:

1. A device for indicating the desired approach glide path to an aircraft on an approach to a landing strip, comprising; a first radiation directing means adjacent one end of said landing strip; a second radiation directing means at said one end of said landing strip; said second radiation directing means being displaced from said first radiation directing means in a direction in line with said desired approach glide path with the first radiation means being closer to the landing strip than the second radiation means; means for supplying energy to said first and said second radiation direction means; means for alternately interrupting the flow of energy of said first radiation directing means and said second radiation directing means, with the interval between the flow of energy to said first radiation directing means and the flow of energy to said second radiation means being smaller than the interval between the flow of energy to said second radiation directing means and the next flow of energy to said first radiation directing means.

2. The device as recited in claim 1 wherein said energizing means is an electrical power supply and said radiation directing means are light sources; said first and second light sources being located in line with the center of said landing strip.

3. The device as recited in claim 2 wherein a cam operated switch is connected between each of said light sources and said power supply; means for driving the cams for said switches at a predetermined constant speed.

4. The device as recited in claim 1 wherein said radiation directing means are mirrors; said mirrors being located in line with the center of said landing strip; means for directing a light beam toward said mirrors.

5. The device as recited in claim 4 wherein said energy interrupting means are synchronously driven light choppers.

References Cited

UNITED STATES PATENTS

| 2,400,232 | 5/1946 | Hall | 340—27 XR |
| 2,734,180 | 2/1956 | Pennow | 340—26 |
| 2,794,967 | 6/1957 | Coggins et al. | 340—26 |

ALVIN H. WARING, Primary Examiner

U.S. Cl. X.R.

340—1.2